March 7, 1961   F. L. TOWNSEND   2,973,983
PRESSURE SEAL
Filed Oct. 24, 1957
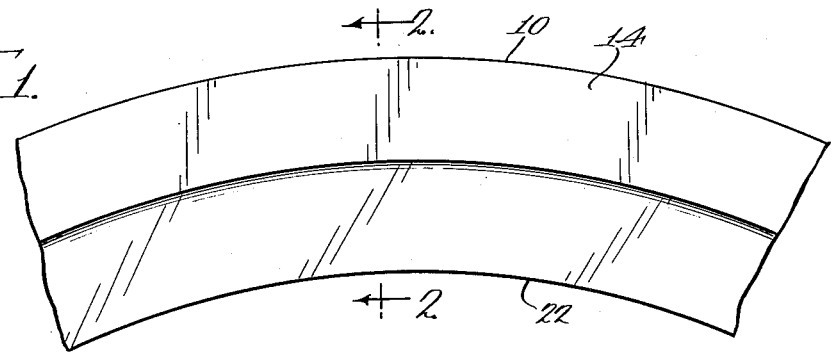
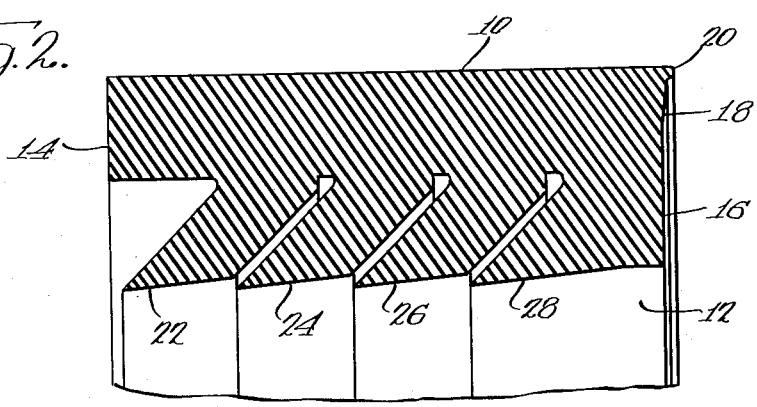
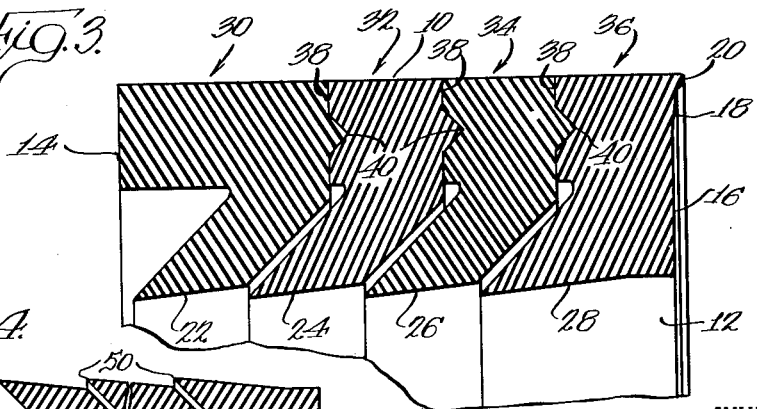
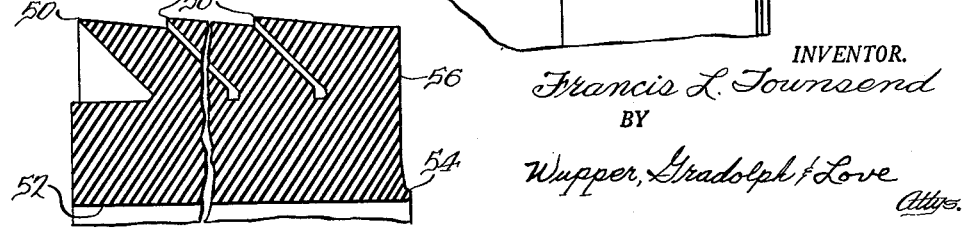
INVENTOR.
Francis L. Townsend
BY
Wupper, Gradolph & Love
Attys.

United States Patent Office 2,973,983
Patented Mar. 7, 1961

2,973,983

PRESSURE SEAL

Francis L. Townsend, West Chicago, Ill., assignor, by mesne assignments, to Crane Packing Company, Morton Grove, Ill., a corporation of Illinois Filed Oct. 24, 1957, Ser. No. 692,083

5 Claims. (Cl. 288—16)

The present invention relates to packings, and more particularly to a packing cartridge intended to take the place of ordinary V ring sets.

V-shaped packing rings of rubber, leather, synthetic rubber or other elastometers as an example, either with or without reenforcement, are used in great number to achieve a fluid seal under conditions where machine elements move relative to each other. They may be mounted upon a rod or piston which moves within a cylindrical cavity, or they may be fixed within a cavity and seal against a moving rod surface. In a typical application for instance, a multiple set of three, four, or more V rings is used in a gland recess for sealing around the piston rod of a hydraulic or pneumatic cylinder where the rod passes through the cylinder end cap.

In such an organization, the end closure of the cylinder is equipped with a generally cylindrical cavity to accommodate the packing rings through the center of which the piston rod passes. The space within the packing gland cavity is filled with several stacked and telescoped V rings formed of some resilient material clamped between adapters or followers at each end by means of a threaded or split ring, for instance. Thus, in a typical application, after the piston rod has been assembled through the packing gland, an adapter ring, and say four or five packing rings are worked one at a time into position within the recess. Another metal adapter ring is then placed on top of the V rings, the stack of rings then being compressed slightly to enable a split ring or other means of retention to be secured in place.

One great difficulty with an assembly of this type, in addition to the problem of working the rings into place, is that the stacking height—that is, the height or length of the complete packing assembly—is very difficult to maintain within even relatively precise limits because of individual variation in ring height dimensions. After assembly, because of this variation, the pressure of the lips of the packing rings against the shaft or rod (the preload or lip interference) varies greatly from one assembly to the next. This is very important, since there should be a slight but constant preload in order to insure proper sealing, whereas excessive preload results in high friction and rapid wear. The best partial answer to this problem in the past has been careful, and therefore expensive, manufacture and inspection, and in some cases to supply a group of packing rings in sets made by a careful selection of individual rings so that the stacking height, and hence the preload pressure, of the set is held fairly close to some desired constant. This is, of course, an expensive procedure and still requires the user to handle a group of rings as individual pieces which need to be worked into place within the packing gland recess, and, during this assembly, intermixing of the rings must be avoided.

It is one of the objects of the present invention to provide multiple V ring-type packings which may be economically manufactured and which are easily held to precise limits as to all important dimensions including stacking height and preload.

Still another object of the present invention is to provide a packing assembly or cartridge unit of the type described above, which can be handled as a single element, which is easy to insert and remove, and which requires no adapter rings at the ends as is commonly necessary.

Yet another object is to provide a novel ring-type packing article which can be used in a conventional packing gland in replacement of ordinary multiple V rings, without difficulty and without the use of adapters at either end, and in which the packing cartridge applies substantially identical sealing annular lips or scrapers against the surface of the moving shaft.

Still another object is to provide a novel packing article or cartridge with improved means for sealing against leakage around the outside of the packing.

Other objects and advantages will become apparent from the following description of a preferred embodiment of my invention which is illustrated in the accompanying drawings.

In the drawings, in which similar characters of reference refer to similar parts throughout the several views:

Fig. 1 may considered as a front elevation of a portion of an annular packing cartridge constructed so as to embody features of the present invention;

Fig. 2 may be considered as a longitudinal, radial sectional view through the packing of Fig. 1, and it may be considered as taken in the direction of the arrows substantially along the line 2—2 of Fig. 1;

Fig. 3 is a view similar to Fig. 2 excepting that it illustrates how the article of Fig. 2 is fabricated from individual pieces which are separately molded; and Figure 4 is a view similar to Fig. 2, but illustrating a modification of the invention adapted to be fixed to a rod or piston so as to move relative to a cylindrical cavity.

The packing cartridge of the present invention comprises a generally cylindrical structure, the external surface being indicated at 10, with an axial passage 12 therethrough. The forward or high pressure end forms a flat, annular, radially disposed surface 14. At the opposite or low pressure end of the cartridge, the width of the annular surface is about twice as great and the portion 16 (the major portion) of this surface toward the center is radially disposed and flat. Outwardly thereof the face tapers rearwardly slightly, as at 18, so that it is not quite in a radial plane. In addition, a small half round bead 20 is formed at the juncture of the back face and the external cylindrical surface.

The cartridges having external surfaces as described are, of course, made in a plurality of sizes to fit various standard or special packing gland dimensions. As thus dimensioned, the external diameter of the surface 10 is such as to form a slip fit in the packing gland recess. The overall length of the packing gland space is slightly less than the distance between the faces 14 and 16. It should be such that the bead 20, when the cartridge is installed, will be compressed axially and expanded radially inwardly and outwardly. This radial expansion of bead 20 results from the fact that its radial dimension is considerably smaller than the radial dimension of the adjoining section. As thus compressed, it acts as an efficient static seal between the body of the cartridge and the retainer ring.

The tapered portion 18 should be somewhat compressed so as to expand radially outwardly slightly, thereby wedging the cartridge against the wall of the recess to prevent working movement of the cartridge.

If the cartridge is somewhat longer than standard, it may be additionally compressed without danger or damage, or, if desired, a small amount of material may be ground or sanded off the forward end 14. This end, it will be noted, is square with the axis and is not depended upon to effect a fluid seal. It may, therefore, be ground, if necessary, without danger of introducing leakage.

Note also that if a cartridge is compressed more than the standard amount for that cartridge, this excess compression takes place through the annular wall which may be considered as a projection of the end 14. As will be explained presently, such excessive compression does not produce a wedging or flattening action on the scraper elements which greatly increases the interference dimension and consequent friction and wear of ordinary V rings.

In the present instance four sealing lips—the equivalent, in effect, of four V rings—are shown. From the high pressure end they are indicated in order by the numerals 22, 24, 26 and 28. Each of these comprises essentially the inner half of a V ring projecting integrally from the annular solid portion. These sealing elements are separated from each other longitudinally so that they can flex, as necessary, to conform to the central shaft without depending upon or interfering with each other. For convenience in manufacturing, the portion of the article forming the end surface 16 may be simply an extension of the rearmost shaft sealing element 28.

Analysis will show that whereas slight endwise compression of a stack of nested V rings causes the rings to flatten so as to flare both outwardly and inwardly, thereby increasing the preload pressure both on the shaft and the gland cavity wall, this effect is not brought about with the present construction. If the cartridge is compressed in an endwise direction, the least sectional thickness of elastomer or other material is in the annular wall which is a projection of the face 14. Thus, any swelling, or increasing of the radial dimension takes place principally in the portion between the face 14 and the first scraper element 22. This does not affect the set or geometry of the scrapers, and if the end face 14 is slightly beyond the edge of the sealing lip 22, this lip will not come against the end wall of the packing gland even if no special clearance space is provided.

Fig. 3 illustrates one manner of fabricating the article of Fig. 2. Here it will be seen that the first sealing lip 22 and the end portion forming the face 14 are molded as one element 30. Similarly, each of the scrapers 24 and 26 is molded as single elements integrally with the directly outlying portion of the annular solid sleeve as is indicated at 32 and 34, respectively. The elements 32 and 34 are identical and may come from the same mold. The last scraper ring 28 is also molded integrally with the outlying portion and with the portion of the article which forms the back face and sealing ridge 16–18–20. This element is indicated generally by the numeral 36.

Each of the molded elements 30, 32, 34 and 36 is joined to the next in line by a flat radial face 38 having a nested annular tongue and groove arrangement 40 between each to assure alignment. During assembly, a front ring 30, a rear ring 36, and as many as are required of the intermediate rings 32—34 are coated with cement on the faces 38 and stuck together to form the cartridge, or this union may be accomplished by vulcanization. Any excess of cement on the external surface 10 is removed and the cartridge is ready for use. In the event that unusual dimensional precision is required, it is simple and inexpensive after assembly to grind the cylindrical surface 10 to a standard dimension and to grind the end surface 14 as required to achieve a precise length.

In use, the cartridge is simply pushed into the gland cavity and the retainer ring inserted. No end adapters are required. The usual difficulty accompanying the use of multiple V rings of working the rings individually into position without cocking or twisting and without entrapping air is, of course, completely avoided.

This invention may also be used to advantage as a packing intended for mounting upon a rod or piston, so that the moving seal is against an internal cylindrical surface as is shown in Fig. 4. Here the lips 50 are external, and dynamically seal against the cylinder while the internal surface 52 is a smooth cylinder for mounting upon a rod or piston. As in the previous example, the static sealing bead 54, which is the counterpart of bead 20, is formed upon the low pressure end of the seal where the back face 56 joins the smooth cylindrical surface 52. It is thus toward the center of the seal rather than at the outside surface.

It will be appreciated that the specific embodiment of the invention described is illustrative only, and that substitutions and modifications can be made without departing from the scope and spirit of the invention, and that the scope of the invention is to be measured by the scope of the following claims.

Having described my invention, what I claim as new and useful and desire to secure by Letters Patent of the United States is:

1. In a fluid packing article, a unitary cartridge formed of resilient material, said cartridge having an annular solid portion bounded by a substantially uninterrupted cylindrical exterior surface, one of the ends of said cartridge being substantially flat and normal to the cylindrical surface, the other of the ends of said cartridge being formed to provide a small peripheral bead extending axially outwardly from said other end where the surface of said other end joins said cylindrical surface, a plurality of mutually independent annular sealing blades extending from said solid annular portion toward the axis with inner free edges defining an axial passage, said blades having sharp free edges and being pitched toward the first said end, the overall axial dimension of the sealing blades at the radially inner ends thereof in the free state of the cartridge being appreciably less than the axial dimension of the solid portion, and no part of the sealing blades extending to the radial plane passing through either end of the solid portion.

2. In a fluid packing article, a unitary cartridge formed of resilient material, said cartridge having an annular solid portion with one substantially smooth cylindrical surface, one of the ends of said cartridge being substantially flat and normal to the cylindrical surface, the other of the ends of said cartridge having a slight outward taper toward the cylindrical surface and being formed to provide a small peripheral bead extending axially outwardly from the surface of the said other end, a plurality of mutually independent annular sealing blades extending from said solid annular portion in a direction away from said smooth cylindrical surface, said blades having sharp free edges and being pitched toward the first said end commencing at a point axially removed from the first said end to leave a ring thereat, the overall axial dimension of the sealing blades at the radially inner ends thereof in the free state of the cartridge being appreciably less than the axial dimension of the solid portion, and no part of the sealing blades extending to the radial plane passing through either end of the solid portion.

3. In a fluid packing article, a unitary cartridge formed of resilient material, said cartridge having an annular solid portion bounded by a cylindrical surface, a plurality of mutually independent annular sealing blades extending from said solid annular portion in a direction away from the cylindrical surface with the free edges adapted for sealing against a second cylindrical surface concentric with the first said cylindrical surface, and said blades having sharp free edges and being pitched toward the first said end, the overall axial dimension of the sealing blades at the radially inner ends thereof in the free state of the cartridge being appreciably less than the axial dimension of the solid portion, and no part of the sealing blades extending to the radial plane passing through either end of the solid portion.

4. In a fluid packing article, a unitary cartridge formed of resilient material, said cartridge having an annular solid portion bounded by a substantially uninterrupted cylindrical interior surface, one of the ends of said cartridge being substantially flat and normal to the cylindrical surface, the other of the ends of said cartridge being formed to provide a small peripheral bead where the last said end surface joins said cylindrical surface, a plurality of mutually independent annular sealing blades extending from said solid annular portion away from the axis with outer free edges defining a cylindrical surface concentric with the first said cylindrical surface, said blades having sharp free edges and being pitched toward the first said end, the overall axial dimension of the sealing blades at the radially inner ends thereof in the free state of the cartridge being appreciably less than the axial dimension of the solid portion, and no part of the sealing blades extending to the radial plane passing through either end of the solid portion.

5. In a fluid packing article, a unitary cartridge formed of resilient material, said cartridge having an annular solid portion bounded by a substantially uninterrupted cylindrical interior surface, one of the ends of said cartridge being substantially flat and normal to the cylindrical surface, the other of the ends of said cartridge being formed to provide a static sealing element where the last said end surface joins said cylindrical surface, a plurality of mutually independent annular sealing blades extending from said solid annular portion away from the axis with outer free edges defining a cylindrical surface, said blades having sharp free edges and being pitched toward the first said end, the overall axial dimension of the sealing blades at the radially inner ends thereof in the free state of the cartridge being appreciably less than the axial dimension of the solid portion, and no part of the sealing blades extending to the radial plane passing through either end of the solid portion.

References Cited in the file of this patent

UNITED STATES PATENTS

| | | |
|---|---|---|
| 1,336,030 | Gammeter | Apr. 6, 1920 |
| 2,233,902 | Schmied | Mar. 4, 1941 |
| 2,278,347 | Cope | Mar. 31, 1942 |
| 2,383,570 | Sellew | Aug. 28, 1945 |
| 2,616,504 | Osmum | Nov. 4, 1952 |
| 2,717,273 | Anderson | Sept. 6, 1955 |
| 2,729,476 | Duggan | Jan. 3, 1956 |
| 2,819,102 | Horvath | Jan. 7, 1958 |